Sept. 15, 1925.
E. G. WEILER
AUTOMOBILE SIGNAL
Filed May 27, 1921
1,553,581
2 Sheets-Sheet 2
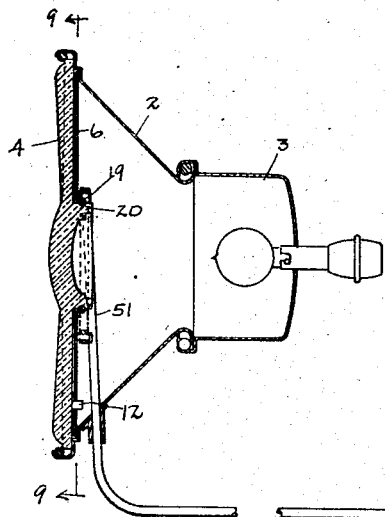
Fig. 8
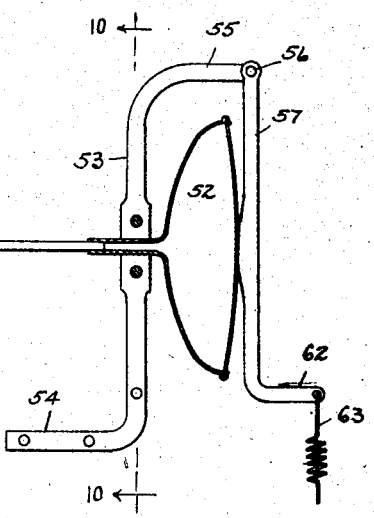
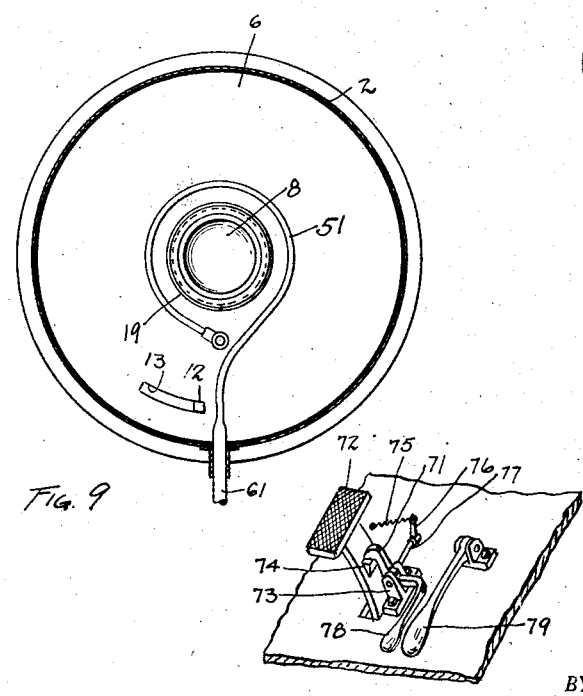
Fig. 9
Fig. 10
Fig. 11
INVENTOR.
Edward G. Weiler
BY
Day, Oberlin & Day
ATTORNEYS Patented Sept. 15, 1925.

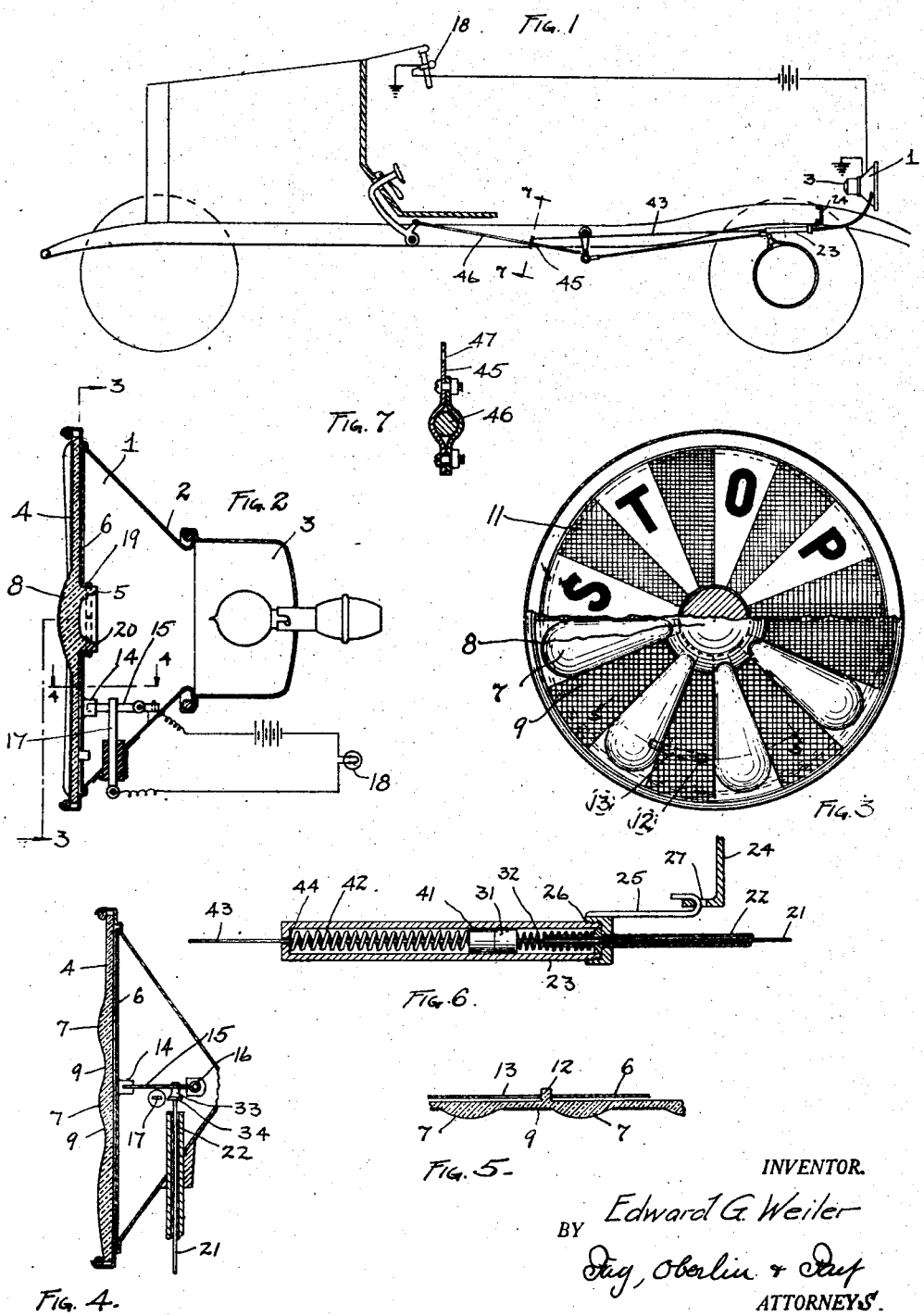

1,553,581

UNITED STATES PATENT OFFICE.

EDWARD G. WEILER, OF CLEVELAND, OHIO.

AUTOMOBILE SIGNAL.

Application filed May 27, 1921. Serial No. 473,200.

*To all whom it may concern:*

Be it known that I, EDWARD G. WEILER, a citizen of the United States, and a resident of Cleveland, county of Cuyahoga, and State of Ohio, have invented a new and useful Improvement in Automobile Signals, of which the following is a specification, the principle of the invention being herein explained and the best mode in which I have contemplated applying that principle, so as to distinguish it from other inventions.

This invention relates to an automobile signaling device. More particularly it comprises means associated with the brake pedal of an automobile which gives an indication as to the slowing down or stopping of the vehicle whenever the brake pedal is brought into use.

The object of the invention is to improve automobile signaling devices and to provide a simple inexpensive device of this character so that the driver of a machine may not be put to the personal inconvenience and discomfort of having to give signals manually whenever he slows down or changes the direction of his car. Other objects of my invention will appear in the course of the following description, wherein many unique and novel features of construction are utilized in the apparatus I have devised for accomplishing the main object of my invention. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a diagrammatic side elevation of an automobile showing my signaling device applied thereto;

Fig. 2 is a vertical sectional view taken centrally through the casing of my signal, the pilot light circuit being shown diagrammatically;

Fig. 3 is a rear elevation of my signaling device, partial in section, taken along the line 3—3 shown in Fig. 2, looking in the direction of the arrows;

Fig. 4 is a detailed view, partially in section, showing a part of the operating mechanism for my signaling device, taken along the line 4—4 shown in Fig. 2, looking in the direction of the arrows;

Fig. 5 is a detailed sectional view taken along the line 5—5, of Fig. 3, looking in the direction of the arrows;

Fig. 6 is a detailed sectional view of a portion of my operating mechanism;

Fig. 7 is a detailed sectional view taken along the line 7—7 shown in Fig. 1, disclosing the fastening elements for connecting the device to the brake-rod;

Fig. 8 is a diagrammatic side elevation of a modified form of operating device for my signal;

Fig. 9 is a rear elevation of my signaling device showing the operating means attached thereto, as it appears when the modified form of construction is employed;

Fig. 10 is a detailed sectional view taken along the line 10—10 shown in Fig. 8, looking in the direction of the arrows, and illustrating the supporting means for the fluid reservoir and the operating lever therefor; and Fig. 11 is a perspective view showing my automatic signal maintaining device and pedal release therefor.

In the preferred form of my construction, as illustrated in Figs. 1 to 7, inclusive, I employ a signal casing, 1, preferably of stamped sheet metal and of conical shape, adapted, at its smaller end, 2, to be seated in the lens holding rim of a tail lamp, 3, in place of the lens usually employed therein and held in position by means of a split wire ring 10. This conical casing at its larger end is provided with a lens, 4, preferably combining a number of structural features designed to simplify the manufacture and assembling and increase the efficiency of the device. Upon the inner face of the lens is provided an integral hub member, 5, in a central position adapted to receive thereover a light rotatable centrally apertured disk, 6, held seated thereon by means of a split wire ring, 19, fitting a groove, 20, on said hub. Said disk is adapted to cover and uncover a series of radial transparent portions, 7, provided on the lens. On its outer face, in axial alignment with the hub, the lens is centrally provided with a small lens portion, 8, intended to serve as the usual tail light bull's-eye for the automobile. Radially arranged about this bull's-eye are a series of alternate opaque, 9, and transparent, 7, portions, the latter preferably comprising elongated lens sections adapted to increase the brilliancy of the light rays passing therethrough.

The cover disk, 6, is also provided with spaced opaque sections, 11, of a size to register with the transparent sections of the lens and thus serve normally to present a black outer face on the signal. The intermediate radial sections of the cover disk, 6, may be transparent like the corresponding portions of the lens, but I preferably make them of translucent material such as sheet celluloid. Upon each of such translucent sections on the upper half of the signal lens, I place a single letter of the word "Stop" (see Fig. 3) so that when the cover disk is rotated an appropriate distance, such word will be plainly visible to parties whom it is desired to inform of a change of speed or direction of the vehicle. I may employ only four transparent radial sections on the signal and also may place the several letters of the word "Stop" upon the horizontally opposite sections only.

The signal lens, in addition to the central hub, carries on its rearward face a projecting lug, 12, formed integrally thereon to one side of the hub, said lug engaging through an elongated slot, 13, in the cover disk and having the function, in conjunction with said slot, of regulating the amount of motion of said disk.

The cover disk is also provided with a rearwardly projecting lug, 14, suitably attached thereto adapted to be engaged by the free end of a spring, 15, the other end, 16, of which is pivotally secured to the side of the casing. The operating member hereinafter described is connected with this spring and serves to maintain the disk in signal obscuring position. An insulated contact finger, 17, projects into the path of the spring last referred to and is adapted to close the electric circuit of a pilot light, 18, preferably located on the instrument board of the automobile, whenever the disk is rotated and said spring is flexed, the other end of said circuit being connected with the spring or grounded upon the casing adjacent to the pivot anchorage for said spring member.

In the preferred form of my construction, a flexible member, 21, is attached to the spring member near its pivoted end and extends rearwardly through a tubular support, 22, extending within a cylindrical casing, 23, supported upon a frame member, 24, of the automobile adjacent the position at which the signal is placed. As shown in Figs. 1 and 6, I preferably attach the cylindrical casing, 23, to the frame member, 24, by means of a hook, 25, secured to the cap 26, of said casing. The hook is adapted to be engaged through a hole, 27, provided in said frame member and the spring tension upon the operating member hereinafter referred to, serves to properly position the casing beneath the car. The flexible wire operating member, 21, is connected at one end to a plunger, 31, slidably engaged within said cylindrical casing and limited in its outward movement by the end of the tubular support within the casing. It is moved toward a central position therein by means of a coiled spring, 32, surrounding the wire adjacent said plunger and seated against the head thereof, and bearing at its other end, against the inner face of the perforated screw cap, 26, which closes the end of the casing.

The tubular support, 22, at one end, is provided with a collar which is engaged within the cap 26, on the cylindrical casing 23, and at its other end enters the signal casing adjacent the pivot point of the disk-operating spring 15, extends within said casing a sufficient distance to serve as an abutment to limit the movement of the operating member. The flexible member, 21, extends through the tubular support, 22, and the upper end thereof is connected to the cover disk operating spring, 15, by means of a fastening element 33, having a shoulder, 34, which co-operates with the projecting end of the tubular support, 22, to limit the outward range of movement of the signal operating wire, 21.

A second plunger, 41, is placed within said cylindrical casing, 23, and is normally held in contact with the first mentioned plunger, 31, by means of a coil spring, 42, surrounding the flexible operating member, 43, and positioned between said plunger, 41, and the inner face, 44 of the opposite apertured end of the casing. The flexible operating member, 43, is secured at one end of the plunger, 41, and extends forwardly through said apertures in the front end of the casing to a suitable connection with the brake rod of the automobile. This connection is illustrated in detail in Fig. 7, and comprises a two-part clip, 45, designed to be bolted together and having a central enlargement adapted to be clamped over the brake rod, 46. One of the clip members has an extension end provided with an aperture, 47, into which the other end of the second flexible element referred to is engaged. The spring associated with the last mentioned flexible member is placed under slight tension when the connection with the brake rod is made so as to exert a pull against the hook, 25, on the cylindrical casing and hold the latter in horizontal position beneath the body of the automobile.

In the modified form of my construction a signal casing of the same character as that illustrated in my preferred form of construction is employed, the operating means comprising a Bourdon tube, 51, which has fluid connection with a fluid reservoir, 52, preferably containing oil attached to the frame of the car adjacent to the position of the signal device. The reservoir is preferably of flat disk-like shape and is held in position by means of a support, 53, the ends of which are bent in opposite directions, the lower end, 54, being suitably shaped for attachment to the frame of the automobile and the upper end, 55, being provided with a pivot element, 56, for holding the operating lever, 57, for the reservoir. This support is preferably constructed of two metal plates, 58, 59, bolted together and suitably shaped at an intermediate point to enclose and securely support the connecting duct, 61, of the oil reservoir. The operating lever of this modified form of my construction is bent outwardly at its free end, 62, and has attached thereto a spring element, 63, connected with the brake rod of the automobile.

While I have described my signal as an attachment for a tail lamp, I do not wish to limit the invention to an attachment of this character, as in the case of the installation of my apparatus upon new cars, it will be unnecessary to make use of the ordinary tail light, as I may easily provide as a single apparatus a signal member originally constructed to embody a casing having the usual tail lamp and the features of my invention.

In order to provide for the automatic maintenance of the signal indication, I provide a latch, lever 71, pivoted to the floor board of the automobile adjacent the brake pedal 72, by means of a suitable support, 73. The brake pedal is provided on one side with a beveled lug, 74, having a shoulder over which the nose of the latch engages. A spring, 75, is attached to an arm on the pivot rod, 77, upon which the latch lever is rigidly mounted. The lower end of the latch lever is bent at right angles and provided with a pedal, 78, positioned adjacent the accelerator pedal, 79, of the automobile, so as to be operable simultaneously therewith.

From the above description the operation of my device will be clearly apparent. Each time the driver of the automobile presses the brake pedal and moves the same a short distance forward the cover disk of the signaling device will be rotated so as to bring transparent or translucent radial portions thereof in alignment with transparent radial portions of the lens of my signaling device and when used at night will disclose the bright radial beams of the signal lamp, certain of said beams bringing into sharp illumination the letters S T O P formed on the inner portion of said glass or upon the transparent or translucent portions of the cover disk. The signal will then remain in operative position being held by the latch lever. When the turn of the corner is completed and the accelerator pedal is pressed, the latch lever, unless especially avoided, will also be touched by the foot of the operator and the signal will thus be released in the ordinary course of driving the car without any special attention of the operator.

Instead of a cover disk having alternate opaque and transparent radial sections, I may as heretofore explained, employ a cover disk having alternate opaque and translucent sections. These translucent sections will be preferably white and of a character to give a distinctly visible effect during the daylight hours even when the light contained in the casing is turned off, and at the same time will give a signal of sufficient brilliancy when used at night time.

The use of the plungers and positioning springs within the casing adjacent the signal permits great freedom of motion with the flexible elements and avoids putting any undue strain upon the flexible element connected with the rotating cover disk. This cover disk may be constructed of any suitable light material, celluloid having been found quite adaptable for this purpose.

The device above described is of simple design and most economical to manufacture. Inasmuch as the casing may be applied to any tail lamp in ordinary use upon an automobile, the attachment of this construction to a machine involves a minimum of labor and the simplicity of the apparatus insures its proper operation even when given no special care or attention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an automobile signaling device, a signal disk of annular shape provided with radial alternate transparent and opaque sections, a second disk formed of thin light weight sheet material located behind said signal disk provided with a series of opaque and translucent radial sections adapted to obscure the transparent sections in the first named disk or permit the light rays to pass therethrough, letters upon said translucent sections of one of said disks to complete the warning indication and means for shifting the said second disk radially.

2. In an automobile signaling device, a signal disk of transparent material provided upon its rear face with a central hub member and a projecting lug formed integrally therewith, and a disk of light sheet material provided with a central aperture of a size to be engaged over said hub, and a second aperture of a size to receive the second lug and permit a limited amount of rotation of said disk.

3. In an automobile signaling device, a signal disk of transparent material provided upon its rear face with a central hub member and a projecting lug formed integrally therewith, a disk of light sheet material provided with a central aperture of a size to be engaged over said hub, a second aperture of a size to receive the second lug and permit a limited amount of rotation of said disk, and an operating element connected with said second-named disk for rotating the same to signaling position.

4. An automobile signaling device comprising a signal casing positioned at the rear of the car, a pair of signal disks having alternate translucent and opaque radial sections, mounted in said casing for motion relative to each other, means for actuating said signal associated with the brake pedal, means for automatically maintaining the indication of said signal, and means associated with the accelerator pedal for releasing said automatic means.

5. An automobile signaling device comprising a signal casing positioned at the rear of the car, a pair of signal disks having clear transparent sections positioned radially about their centers and alternating with intermediate sections of other character, means for mounting said disks in said casing for motion relative to each other, means for actuating said signal associated with the brake pedal, means for automatically maintaining the indication of said signal, and means associated with the accelerator pedal for releasing said automatic means.

Signed by me, this 21st day of May, 1921.

EDWARD G. WEILER.